US012058634B2

(12) United States Patent
Chen et al.

(10) Patent No.: US 12,058,634 B2
(45) Date of Patent: *Aug. 6, 2024

(54) METHOD, APPARATUS AND SYSTEM FOR INDICATING CARRIER FREQUENCY OFFSET (71) Applicant: HUAWEI TECHNOLOGIES CO., LTD., Guangdong (CN)

(72) Inventors: Zhe Chen, Shenzhen (CN); Zhe Jin, Beijing (CN); Yiling Wu, Beijing (CN); Weiliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,086

(22) Filed: Apr. 18, 2023

(65) Prior Publication Data
US 2023/0300762 A1 Sep. 21, 2023

Related U.S. Application Data (63) Continuation of application No. 16/029,635, filed on Jul. 8, 2018, now Pat. No. 11,678,277, which is a continuation of application No. PCT/CN2016/070509, filed on Jan. 8, 2016.

(51) Int. Cl.
H04W 56/00 (2009.01)
H04L 27/26 (2006.01)
H04W 72/04 (2023.01)

(52) U.S. Cl.
CPC ....... *H04W 56/001* (2013.01); *H04L 27/2646* (2013.01); *H04L 27/2659* (2013.01); *H04W 72/04* (2013.01)

(58) Field of Classification Search
CPC ............... H04W 56/001; H04W 72/04; H04L 27/2646; H04L 27/2659
See application file for complete search history.

(56) References Cited

U.S. PATENT DOCUMENTS

| 9,591,533 | B2 | 3/2017 | Song | |
|---|---|---|---|---|
| 2011/0281574 | A1 | 11/2011 | Patel | |
| 2015/0208296 | A1* | 7/2015 | Song | H04W 36/0085 370/331 |
| 2016/0183170 | A1 | 6/2016 | Pu | |

(Continued)

FOREIGN PATENT DOCUMENTS

| CN | 101272586 A | 9/2008 |
|---|---|---|
| CN | 101534558 A | 9/2009 |

(Continued)

OTHER PUBLICATIONS

Office Action dated Mar. 12, 2024, issued for Chinese Application No. 202011505323.8 (7 pages).

(Continued)

*Primary Examiner* — Rushil P. Sampat (57) ABSTRACT

Embodiments of the present invention provide an communications method. For example, the apparatus receives first information that indicates a first offset from a first set of offsets, wherein the first offset is an offset from a first carrier frequency that is multiple of 100 KHz, and then obtains a carrier frequency of a cell according to the first offset indicated by the first information.

27 Claims, 5 Drawing Sheets

(56) References Cited

U.S. PATENT DOCUMENTS

| | | |
|---|---|---|
| 2016/0218856 A1* | 7/2016 | Adhikary .............. H04L 7/0037 |
| 2017/0201393 A1 | 7/2017 | Gaal |
| 2017/0245288 A1 | 8/2017 | Lindoff |
| 2018/0184390 A1 | 6/2018 | Wu |
| 2018/0219662 A1 | 8/2018 | Kim |
| 2018/0270008 A1 | 9/2018 | Yi |
| 2018/0278355 A1 | 9/2018 | Shin |
| 2018/0294996 A1* | 10/2018 | Sorrentino .......... H04L 27/2657 |
| 2018/0317185 A1 | 11/2018 | Chen |
| 2018/0376405 A1 | 12/2018 | Han |
| 2019/0036756 A1* | 1/2019 | Yi ........................ H04W 48/16 |

FOREIGN PATENT DOCUMENTS

| | | |
|---|---|---|
| CN | 101778482 A | 7/2010 |
| KR | 20100112160 A | 10/2010 |
| WO | 2008038090 A2 | 4/2008 |
| WO | 2011054316 A1 | 5/2011 |
| WO | 2017018966 A1 | 2/2017 |
| WO | 2017018969 A1 | 2/2017 |
| WO | 2017123279 A1 | 7/2017 |

OTHER PUBLICATIONS

3GPP TS 36.101 V13.1.0 (Oct. 2015), 3rd Generation Partnership Project; Technical Specification Group Radio Access Network; Evolved Universal Terrestrial Radio Access (E-UTRA); User Equipment (UE) radio transmission and reception (Release 13), total 761 pages.

3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13), total 507 pages.

XP051010218 R4-157639 Huawei,"On channel arrangement for NB-IOT", 3GPP RAN WG4 Meeting #77,Anaheim, US, Nov. 16-20, 2015, total 4 pages.

XP051053343 R1-160020 Huawei et al., "Synchronization signal design",3GPP TSG RAN WG1 NB-IoT Ad-Hoc Meeting,Budapest, Hungary, Jan. 18-20, 2016, total 5 pages.

XP011055045 Jan-Jaap van de Beek et al.,"A Time and Frequency Synchronization Scheme for Multiuser OFDM", IEEE Journal on Selected Areas in Communications, vol. 17, No. 11, Nov. 1999, total 15 pages.

XP011108429 Michele Morelli,"Timing and Frequency Synchronization for the Uplink of an OFDMA System",IEEE Transactions on Communications, vol. 52, No. 2, Feb. 2004, total 11 pages.

3GPP TSG RAN WG1 Meeting #84 ,R1-160408,"Operation mode indication and channel raster for NB-IoT",Intel Corporation,St Julian's, Malta, Feb. 15-19, 2016, total 4 pages.

Communication under Rule 71(3) EPC dated Mar. 4, 2021 issued in European Application No. 16 882 957.0, 8 pages.

3GPP TS 36.213 V13.0.0 3rd Generation Partnership Project; Technical Specification Group Radio Access Network; Evolved Universal Terrestrial Radio Access (E-UTRA); Physical layer procedures(Release 13) Dec. 2015 total 326 pages.

U.S. Appl. No. 62/276,219, filed 2017.

3GPP TS 36.104 V13.2.0 (Jan. 2016) (Year: 2016).

* cited by examiner

METHOD, APPARATUS AND SYSTEM FOR INDICATING CARRIER FREQUENCY OFFSET

CROSS-REFERENCE TO RELATED APPLICATION

This application is a continuation of U.S. patent application Ser. No. 16/029,635, filed on Jul. 8, 2018, now issued as U.S. Pat. No. 11,678,277 which is a continuation of International Application No. PCT/CN2016/070509, filed on Jan. 8, 2016. All of the aforementioned patent applications are hereby incorporated by reference in their entireties.

TECHNICAL FIELD

The present invention relates to the wireless communications technologies, and in particular, to an information sending method, an apparatus, and a system.

BACKGROUND

An Internet of Things is a network in which various devices having capabilities of perceptivity, computation, execution, and communication are deployed to obtain information about a physical world for information transmission, collaboration, and processing, so as to implement interconnection between human and things and between things and things.

A subject on Narrowband Internet of Things (NB-IoT) is mainly used to study a method for supporting a low-cost Internet of Things with ultra-low complexity in a cellular mobile network. In the NB-IoT, when a terminal supporting NB-IoT communication uses an existing cellular mobile network architecture for communication, a used frequency band, in comparison with an original frequency band of the cellular mobile network, has three operation modes: a stand-alone frequency band operation (stand-alone operation) mode, a guard band operation mode, and an in-band operation mode.

In the guard band operation mode or in the in-band operation mode, communication quality of the NB-IoT is poor.

SUMMARY

The present invention provides an information indication method, to effectively improve quality of NB-IoT communication between a base station and a terminal.

In the embodiments of this application, the base station determines first information indicating a first carrier frequency offset, and sends the first information to the terminal. The first carrier frequency offset is a carrier frequency offset between an actual cell carrier center frequency and a cell carrier center frequency that is obtained by the terminal. The terminal obtains the actual cell carrier center frequency according to the first information.

According to one aspect, an embodiment of this application provides an information sending method, including: determining, by a base station, first information indicating a first carrier frequency offset, where the first carrier frequency offset is a carrier frequency offset between an actual cell carrier center frequency and a cell carrier center frequency that is obtained by a terminal; and sending, by the base station, the first information to the terminal, where the first information is used to obtain the actual cell carrier center frequency.

According to another aspect, an embodiment of this application provides another information receiving method, including: receiving, by a terminal, first information that indicates a first carrier frequency offset and that is sent by a base station, where the first carrier frequency offset is a carrier frequency offset between an actual cell carrier center frequency and a cell carrier center frequency that is obtained by the terminal; and obtaining, by the terminal, the actual cell carrier center frequency according to the first information.

Based on the foregoing aspects, this application further provides the following possible designs.

In a possible design, the foregoing mentioned cell carrier center frequency may be a cell uplink carrier center frequency, a cell downlink carrier center frequency, or a cell uplink carrier center frequency and a cell downlink carrier center frequency. The terminal obtains an actual cell uplink carrier center frequency, and can initiate a random access procedure on the actual cell uplink carrier center frequency, to implement uplink synchronization with the base station. The terminal obtains an actual cell downlink carrier center frequency, and can accurately perform a procedure such as sampling frequency synchronization.

In a possible design, the first information includes at least one of a value of the first carrier frequency offset and an indication parameter of the first carrier frequency offset, and the indication parameter of the first carrier frequency offset corresponds to the value of the first carrier frequency offset. When the first information includes the value of the first carrier frequency offset, the terminal can directly obtain the value of the first carrier frequency offset without additional processing. When the first information includes the indication parameter of the first carrier frequency offset, in comparison with the previous example, because the value of the first carrier frequency offset may have a relatively large data volume, if the value is directly sent as the first information to the terminal, a problem of a system resource waste is caused. However, the indication parameter of the first carrier frequency offset with a relatively small data volume can exactly resolve this problem, thereby improving system resource utilization.

In a possible design, the first information includes a value of a root index of a synchronization signal, and the value of the root index corresponds to a value of the first carrier frequency offset. For example, the synchronization signal may be a secondary synchronization signal SSS, the SSS includes a pair of ZC (Zadoff-Chu) sequences: SSS1 and SSS2, and the root index includes a root index u1 in the SSS1 and a root index u2 in the SSS2.

In a possible design, the first information includes parameters such as a location of a synchronization signal and a sequence type, and these parameters correspond to a value of the first carrier frequency offset.

In a possible design, the first information includes a bandwidth parameter and a resource block index parameter, and the bandwidth parameter and the resource block index parameter correspond to a value of the first carrier frequency offset. For example, the bandwidth parameter may be bandwidth of a wireless mobile network, and the resource block index parameter is an index of a resource block in which a carrier of a cell is located in the bandwidth of the wireless mobile network system. The channel bandwidth parameter is an important parameter for the terminal. In a process of implementing the technical solutions of the present invention, the channel bandwidth parameter is sent to the terminal, so that the terminal implements another function according to the bandwidth parameter.

In a possible design, the base station sends a broadcast message or a dedicated message to the terminal, where the broadcast message or the dedicated message carries the first information; and the terminal receives the broadcast message or the dedicated message.

In a possible design, when the first information includes the value of the root index of the synchronization signal, the first information is added to the synchronization signal, for example, the SSS. During downlink synchronization, the SSS is sent by the base station to the terminal. In this case, if the first information is sent in advance at the same time as an SSS sending stage at the downlink synchronization stage to ensure that the terminal can obtain the first information as early as possible, the actual cell downlink carrier center frequency is obtained at the downlink synchronization stage, so that a case in which the terminal cannot receive a broadcast message of a cell due to a downlink synchronization failure and consequently a series of subsequent communication procedures fail is avoided.

In a possible design, the cell carrier center frequency obtained by the terminal is obtained when the terminal receives the synchronization signal.

In a possible design, the cell carrier center frequency obtained by the terminal is obtained by the terminal by receiving the broadcast message or the dedicated message.

In a possible design, the foregoing methods further include: determining, by the base station, second information indicating a second carrier frequency offset, and sending the second information to the terminal. The second carrier frequency offset is a carrier frequency offset between an actual inter-frequency cell carrier center frequency and an inter-frequency cell carrier center frequency that is obtained by the terminal. The terminal obtains the actual inter-frequency cell carrier center frequency according to the second information. The terminal determines the actual inter-frequency cell carrier center frequency according to the second information, so that a cell search can be rapidly and accurately performed on an inter-frequency cell, thereby making an adequate preparation for a subsequent possible cell handover.

In a possible design, the foregoing cell is a cell supporting NB-IoT communication.

According to still another aspect, an embodiment of the present invention provides a base station, and the base station has a function of implementing behavior of the base station in the foregoing method designs. The function may be implemented by using hardware, or implemented by executing corresponding software by hardware. The hardware or software includes one or more units corresponding to the foregoing function.

In a possible design, a structure of the base station includes a processor and a transmitter. The processor is configured to support the base station in performing corresponding functions in the foregoing methods. The transmitter is configured to support communication between the base station and a terminal, and send information or an instruction in the foregoing methods to the terminal. The base station may further include a memory, where the memory is configured to be coupled to the processor, and store a program instruction and data that are necessary for the base station.

According to yet another aspect, an embodiment of the present invention provides a terminal, and the terminal has a function of implementing behavior of the terminal in the foregoing method designs. The function may be implemented by using hardware, or implemented by executing corresponding software by hardware. The hardware or software includes one or more units corresponding to the foregoing function. The module may be software and/or hardware.

In a possible design, a structure of the terminal includes a receiver and a processor. The processor is configured to support the terminal in performing corresponding functions in the foregoing methods. The receiver is configured to support communication between the terminal and a base station, and receive information or an instruction sent by the base station in the foregoing methods. The terminal may further include a memory, where the memory is configured to be coupled to the processor, and store a program instruction and data that are necessary for the base station.

According to still yet another aspect, an embodiment of the present invention provides a communications system, and the system includes the base station and the terminal according to the foregoing aspects.

According to a further aspect, an embodiment of the present invention provides a computer storage medium. The computer storage medium is configured to store a computer software instruction used by the foregoing base station, and the computer software instruction includes a program related to execution of the foregoing aspect.

According to a still further aspect, an embodiment of the present invention provides a computer storage medium. The computer storage medium is configured to store a computer software instruction used by the foregoing terminal, and the computer software instruction includes a program related to execution of the foregoing aspect.

According to a yet further aspect, an embodiment of the present invention provides a chip system, including at least one processor, a memory, an input/output part, and a bus, where the at least one processor obtains an instruction in the memory by using the bus, so as to implement design functions of the base station in the foregoing methods.

According to a still yet further aspect, an embodiment of the present invention provides a chip system, including at least one processor, a memory, an input/output part, and a bus, where the at least one processor obtains an instruction in the memory by using the bus, so as to implement design functions of the terminal in the foregoing methods.

According to the technical solutions provided in the embodiments of the present invention, the base station sends, to the terminal, the first information indicating the first carrier frequency offset, so that the terminal obtains the actual cell carrier center frequency. The terminal performs a communication procedure such as synchronization with the base station on the actual cell carrier center frequency, so as to avoid adverse impact, such as an uplink synchronization failure, caused by a cognitive deviation of the terminal from the cell carrier center frequency. Therefore, quality of communication between the terminal and the base station is effectively improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

A Cellular Internet of Things (CIoT) implements Internet of Things communication based on an existing wireless communications system. That is, a system architecture on which a system of the Cellular Internet of Things runs is similar to that of the wireless communications system such as a Long Term Evolution (LTE) system. An NB-IoT in the present invention derives from a proposal of 3rd Generation Partnership Project (3GPP) radio access network (RAN) Meeting #69. An objective of the NB-IoT is to specify a radio access manner for the Cellular Internet of Things, to implement wide-coverage, low-delay, and low-cost communication.

Figure 1:
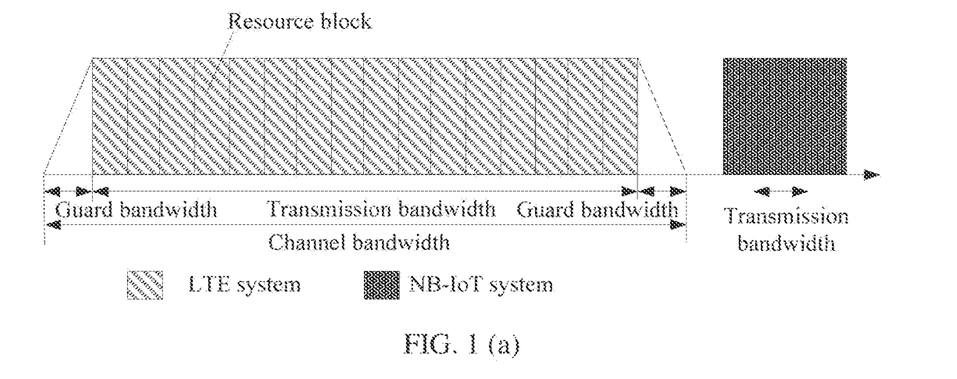
FIG. 1(a) is a schematic diagram of a stand-alone operation mode supported by a Narrowband Internet of Things according to an embodiment of the present invention.
FIG. 1(b) is a schematic diagram of a guard band operation mode supported by a Narrowband Internet of Things according to an embodiment of the present invention.
FIG. 1(c) is a schematic diagram of an in-band operation mode supported by a Narrowband Internet of Things according to an embodiment of the present invention.

A proposal related to the NB-IoT at 3GPP RAN Meeting #69 points out that the NB-IoT should support three different operation modes:

1. Stand-alone operation: The NB-IoT works on a stand-alone carrier frequency band, as shown in FIG. 1(a).
2. Guard band operation: The NB-IoT works on a resource block that is not used in an LTE carrier guard band, as shown in FIG. 1(b).
3. In-band operation: The NB-IoT works on a resource block of an LTE carrier frequency band (that is, channel bandwidth), as shown in FIG. 1(c). For example, in such an operation mode, the NB-IoT may use a resource block in the LTE carrier frequency band as an uplink carrier frequency band of the NB-IoT, and use another resource block in the LTE carrier frequency band as a downlink carrier frequency band of the NB-IoT.

Figure 2:
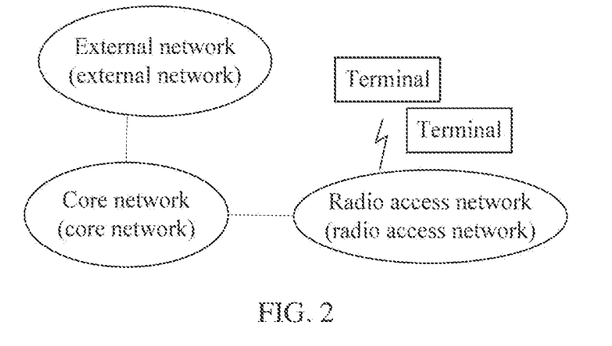
FIG. 2 is a diagram of a system architecture according to an embodiment of the present invention.

FIG. 2 is a diagram of a system architecture according to an embodiment of the present invention. As shown in FIG. 2, a terminal accesses an external network by using a radio access network (RAN) and a core network (CN). Technologies described in the present invention may be applied to an NB-IoT system. Certainly, the technologies may be further applied to other wireless communications systems that use various radio access technologies, for example, a system that uses an access technology such as Code Division Multiple Access, Frequency Division Multiple Access, Time Division Multiple Access, Orthogonal Frequency Division Multiple Access, or Single Carrier Frequency Division Multiple Access, and a subsequent evolved system such as a 5th generation 5G system.

In this application, nouns "network" and "system" are often interchangeably used, but a person skilled in the art may understand meanings of the nouns. For clear description, an LTE system is used as an example for description herein. In the LTE system, an evolved UMTS terrestrial radio access (E-UTRA) network is used as a radio access network, and an evolved packet core (EPC) network is used as a core network. Because a system architecture on which the NB-IoT system runs is similar to that of the LTE system, the foregoing description of the LTE system architecture is also applicable to the NB-IoT system.

Figure 3:
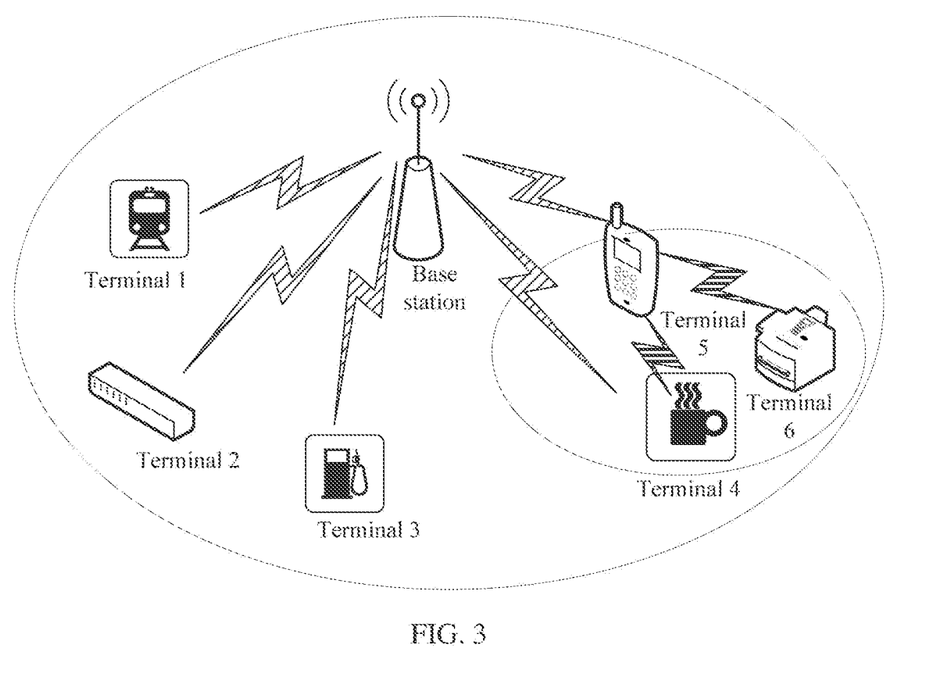
FIG. 3 is an application scenario according to an embodiment of the present invention.

FIG. 3 shows an application scenario according to an embodiment of the present invention. FIG. 3 includes a base station and terminals 1 to 6. The base station is an apparatus that is deployed in a radio access network and that is configured to provide a wireless communication function for the terminal. The base station may include a macro base station, a micro base station, a relay station, an access point, and the like that are in various forms. In systems that use different radio access technologies, a device having a function of the base station may be named differently, for example, named an evolved NodeB (eNodeB) in an LTE system, and named a NodeB in a 3rd generation network. The terminal may include various devices having a wireless communication function, such as a handheld device, a vehicle-mounted device, a wearable device, and a computer device, or another processing device connected to a wireless modem, a mobile station (MS) and user equipment (UE) that are in various forms, and the like. As shown in FIG. 3, the base station may communicate with any one of the terminals 1 to 6. In addition, the terminal 4, the terminal 5, and the terminal 6 can form a small system. In the small system, the terminal 5 may separately communicate with the terminal 4 and the terminal 6.

The following gives some explanations for nouns and concepts related to this application.

A cell carrier center frequency in this application is a cell carrier center frequency point, and can also be referred to as a cell carrier frequency for short in some scenarios. The cell carrier center frequency includes a cell uplink carrier center frequency and a cell downlink carrier center frequency.

In this application, a cell supporting an NB-IoT is referred to as an NB-IoT cell for short.

In an existing LTE system, communication is performed only on a carrier frequency band that is specially allocated for use, that is, the communication is in a form similar to the foregoing stand-alone operation mode. According to the existing 3GPP Technical Standard (technical standard, TS) 36.104, the cell carrier center frequency needs to be an integral multiple of 100 kilohertz (kHz), that is, a channel raster rule is satisfied. The cell uplink carrier center frequency (uplink carrier frequency for short) and the cell downlink carrier center frequency (downlink carrier frequency for short) are identified by an E-UTRA absolute radio frequency channel number (EARFCN), and a value range of the EARFCN is 0 to 65535. A relationship between the EARFCN and the downlink carrier frequency (unit: megahertz (MHz)) is indicated by formula (1): $F_{DL\_low}+0.1(N_{DL}-N_{Offs-DL})$, where $F_{DL\_low}$ and $N_{Offs-DL}$ are given in Table 5.7.3-1 in 3GPP TS 36.104, $F_{DL}$ is the downlink carrier frequency, and $N_{DL}$ is a downlink EARFCN. A relationship between the EARFCN and the uplink carrier frequency (unit: megahertz (MHz)) is indicated by formula (2): $F_{UL}=F_{UL\_low}+0.1 \ (N_{UL}-N_{Offs-UL})$, where $F_{UL}$ low and $N_{Offs-UL}$ are given in Table 5.7.3-1 in 3GPP TS 36.104, $F_{UL}$ is the uplink carrier frequency, and $N_{UL}$ is an uplink EARFCN.

During a cell search, a terminal performs search on a carrier frequency of an integral multiple of 100 kHz. Once a cell is found, the terminal attempts to camp on the cell, and reads a broadcast message that is sent by the base station by using the cell. The broadcast message includes an uplink EARFCN of the cell. The terminal may obtain an uplink carrier center frequency of the cell according to formula (2), and further initiate a random access procedure on the carrier center frequency to establish a connection to a network. In addition, the broadcast message may further include downlink EARFCNs of other inter-frequency cells. Similarly, based on the downlink EARFCNs of the other inter-frequency cells, the terminal may determine downlink carrier center frequencies of these inter-frequency cells, rapidly find these inter-frequency cells, and perform a subsequent cell reselection or cell handover procedure.

The following problems exist in the foregoing procedure for an NB-IoT system: When the NB-IoT system works in an operation mode 2 or 3, an NB-IoT cell carrier center frequency cannot fall on an integral multiple of 100 kHz. That is, there is an offset between a value of the NB-IoT cell carrier center frequency (the frequency may be referred to as an actual cell carrier center frequency) and an original value that may be used as a cell carrier center frequency in the LTE system. Therefore, during an NB-IoT cell search, although the terminal performs downlink synchronization with the base station on the NB-IoT cell carrier center frequency, the terminal mistakes the NB-IoT cell carrier center frequency for an integral multiple of 100 kHz for storage (the frequency may be referred to as a cell carrier center frequency obtained by the terminal). This may subsequently cause a failure in, for example, sampling frequency synchronization. In addition, there is an offset between an NB-IoT cell uplink carrier center frequency (the frequency may also be referred to as the cell carrier center frequency obtained by the terminal) obtained by means of calculation according to an EARFCN in the broadcast message and an NB-IoT cell uplink carrier center frequency (the frequency may also be referred to as the actual cell carrier center frequency). Then, when the terminal initiates the random access procedure according to the NB-IoT cell uplink carrier center frequency obtained by means of calculation, a random access failure may probably be caused, thereby causing a failure in uplink synchronization between the terminal and the base station. Similarly, there is an offset between an NB-IoT inter-frequency cell downlink carrier center frequency obtained by the terminal and an actual NB-IoT inter-frequency cell downlink carrier center frequency. This also causes a failure in subsequent cell reselection or a subsequent cell handover. In this case, quality of NB-IoT communication is severely affected.

Figure 4:
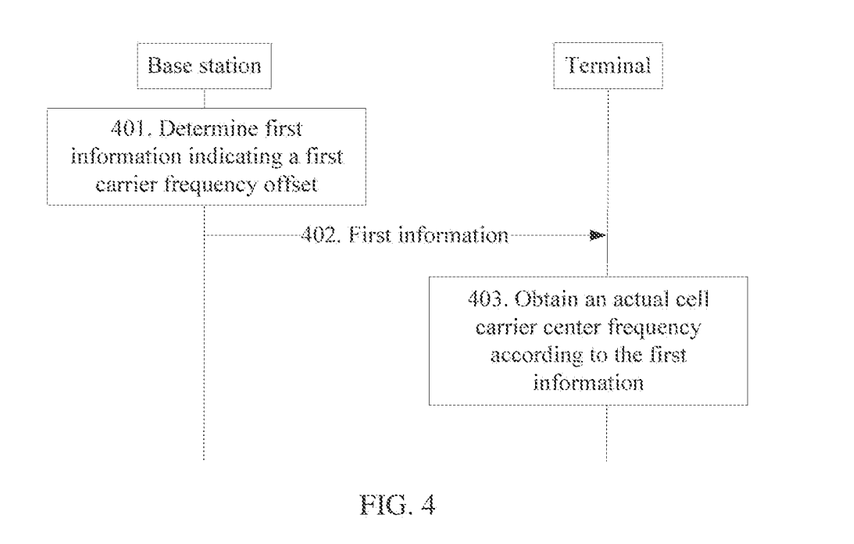
FIG. 4 is a schematic flowchart of an information indication method according to an embodiment of the present invention.

Based on the foregoing problems, FIG. 4 provides a schematic flowchart of an information indication method. The method may be applied to the system architecture shown in FIG. 2 and the application scenario shown in FIG. 3. The method includes the following steps:

401. A base station determines first information indicating a first carrier frequency offset, where the first carrier frequency offset is a carrier frequency offset between an actual cell carrier center frequency and a cell carrier center frequency that is obtained by a terminal.

402. The base station sends the first information to the terminal, where the first information is used to obtain the actual cell carrier center frequency.

403. The terminal obtains the actual cell carrier center frequency according to the first information.

The following performs detailed description by using an example in which a cell is a cell in an NB-IoT system and the NB-IoT system works in an operation mode 2 or 3.

The base station may learn the actual cell carrier center frequency. The base station obtains, according to the actual cell carrier center frequency, a frequency that is of an integral multiple of 100 kHz and that is closest to the actual cell carrier center frequency, and may further obtain, according to formula (1) or (2) and Table 5.7.3.1 in 3GPP TS 36.104, an EARFCN corresponding to the closest frequency of an integral multiple of 100 kHz. The actual cell carrier center frequency may be divided into an actual cell downlink carrier center frequency and an actual cell uplink carrier center frequency, and the EARFCN includes a downlink EARFCN and an uplink EARFCN. The base station may obtain a value of the first carrier frequency offset according to the actual cell carrier center frequency and the frequency that is of an integral multiple of 100 kHz and that is closest to the actual cell carrier center frequency.

It should be noted that, the foregoing frequency that is of an integral multiple of 100 kHz and that is closest to the actual cell carrier center frequency is the cell carrier center frequency obtained by the terminal, and may be added to a broadcast message or a dedicated message and obtained by the terminal, or may be obtained when the terminal receives a synchronization signal. When the cell carrier center frequency obtained by the terminal is added to the broadcast message or the dedicated message and obtained by the terminal, the base station may notify the terminal of the obtained EARFCN by adding the obtained EARFCN to the broadcast message.

The base station needs to notify the terminal of the obtained value of the first carrier frequency offset, so that the terminal can accurately learn the actual cell carrier center frequency. The base station may send, to the terminal, the first information of the first carrier frequency offset corresponding to the value of the first carrier frequency offset.

In a first example, the first information determined by the base station includes the value of the first carrier frequency offset. A benefit of such a manner is convenient and simple, and the terminal can directly obtain the value of the first carrier frequency offset without additional processing.

In a second example, the first information determined by the base station includes an indication parameter of the first carrier frequency offset, where the indication parameter of the first carrier frequency offset corresponds to the value of the first carrier frequency offset. The correspondence may be agreed on by the base station and the terminal in advance, or may be separately preconfigured in the base station and the terminal. For example:

According to research on the NB-IoT system and an LTE system, the base station may preset possible values for the value of the first carrier frequency offset, and map the values in a one-to-one manner to indication parameters of the first carrier frequency offset.

TABLE 1

| Indication parameters of a first carrier frequency offset | 1, 2, . . . , 31 |
|---|---|
| Values of a first carrier frequency offset (kHz) | −50, −47.5, −42.5, −40, −37.5, −32.5, −30, −27.5, −22.5, −20, −17.5, −12.5, −10, −7.5, −2.5, 0, 2.5, 7.5, 10, 12.5, 17.5, 20, 22.5, 27.5, 30, 32.5, 37.5, 40, 42.5, 47.5, 50 |

As shown in Table 1, the indication parameters of the first carrier frequency offset correspond one-to-one to the values of the first carrier frequency offset from left to right. In one of specific examples, it may be learned, from the foregoing table, that an indication parameter "2" of the first carrier frequency offset corresponds to a value −47.5 kHz of the first carrier frequency offset, and so on. After obtaining the value of the first carrier frequency offset, the base station may determine the indication parameter of the first carrier frequency offset as the first information according to Table 1. Advantages of the foregoing method are as follows: Because the value of the first carrier frequency offset may have a relatively large data volume, if the value is directly sent as the first information to the terminal, a problem of a system resource waste is caused. However, the indication parameter of the first carrier frequency offset with a relatively small data volume can exactly resolve this problem, thereby improving system resource utilization.

In a third example, the first information determined by the base station includes a value of a root index of a synchronization signal. For example, information about the first carrier frequency offset may correspond to a value of a root index of a secondary synchronization signal (SSS). For example, a set {u1, u2} of a root index u1 of an SSS1 and a root index u2 of an SSS2 corresponds to the value of the first carrier frequency offset, where the SSS1 and the SSS2 are included in the SSS. The correspondence may be agreed on by the base station and the terminal in advance, or may be separately preconfigured in the base station and the terminal.

In the NB-IoT system, the SSS is a pair of ZC (Zadoff-Chu) sequences: an SSS1 and an SSS2. A basic expression for a ZC sequence whose length is L is:

$$zc(n)=e^{-j\pi un(n+1+2q)/L}, n=0,1, \ldots, L-1, q \in Z, u \in Z$$

where u is a root index of the ZC sequence, and q is an offset parameter. For each SSS, u may have L−1 values. Different root indexes of ZC sequences may be used to distinguish different values of the first carrier frequency offset. Specifically, possible values for the value of the first carrier frequency offset that are learned by the base station in advance may be mapped in a one-to-one manner to the set {u1, u2} of the root index u1 of the SSS1 and the root index u2 of the SSS2 as the first information. That is, each value of the first carrier frequency offset corresponds to a possible {u1, u2}. For example, {1, 2} corresponds to −47.5 kHz.

In a fourth example, the first information determined by the base station includes a channel bandwidth parameter and a resource block (RB) index parameter. For example, the channel bandwidth parameter is a value of channel bandwidth of an LTE system, and the resource block index is an index of a resource block in which a carrier of the cell is located in the channel bandwidth of the LTE system. Further, referring to FIG. 1(c), the channel bandwidth of the LTE system is divided into 16 resource blocks, and these resource blocks are numbered from left to right in ascending order of frequency channel numbers, to form indexes 0 to 15. In the figure, the carrier of the cell occupies a fourth resource block on the channel bandwidth of the LTE system. In this case, a corresponding resource block index is 3.

The channel bandwidth parameter and the resource block index correspond to the value of the first carrier frequency offset. The correspondence may be agreed on by the base station and the terminal in advance, or may be separately preconfigured in the base station and the terminal. For example:

The channel bandwidth of the LTE system has the following values: 1.4 MHz, 3 MHz, 5 MHz, 10 MHz, 15 MHz, and 20 MHz. An available RB quantity of corresponding channel bandwidth may be obtained from Table 5.6-1 in 3GPP TS 36.101.

| Table 5.6-1 in 3GPP TS 36.101 | | | | | | |
|---|---|---|---|---|---|---|
| | Channel bandwidth (MHz) | | | | | |
| | 1.4 | 3 | 5 | 10 | 15 | 20 |
| Available RB quantity $N_{RB}$ | 6 | 15 | 25 | 50 | 75 | 100 |

These RBs may be numbered in order of frequencies (for example, in ascending order of frequencies (that is, from left to right shown in FIG. 1(c)), for example, 0, 1, . . . , and $N_{RB}-1$.

When the channel bandwidth $B_{LTE}$ of the LTE system is 3 MHz, 5 MHz, or 15 MHz, if a resource block index in information about the first carrier frequency offset meets $$n_{RB} = \frac{N_{RB}+1}{2},$$

the value of the first carrier frequency offset is Δf=0;

if $n_{RB} > \frac{N_{RB}+1}{2}$, $$\Delta f = \left(n_{RB} - \frac{N_{RB}+1}{2}\right) \times 180 + \qquad (3)$$

$$7.5 - \text{round}_{100}\left\{\left(n_{RB} - \frac{N_{RB}+1}{2}\right) \times 180 + 7.5\right\} \text{ (kHz);}$$

or if $n_{RB} < \frac{N_{RB}+1}{2}$, $$\Delta f = \left(n_{RB} - \frac{N_{RB}+1}{2}\right) \times 180 - 7.5 - \qquad (4)$$

$$\text{round}_{100}\left\{\left(n_{RB} - \frac{N_{RB}+1}{2}\right) \times 180 - 7.5\right\} \text{ (kHz),}$$

where round$_{100}${x} indicates a calculation manner, in which an integral multiple of 100 is obtained by means of calculation, and an absolute value of a difference between the integral multiple of 100 and x is the smallest.

When the channel bandwidth $B_{LTE}$ of the LTE system is 1.4 MHz, 10 MHz, or 20 MHz, if $n_{RB} \leq \frac{N_{RB}}{2} - 1$, $$\Delta f = \left(n_{RB} - \frac{N_{RB}}{2} + 1\right) \times 180 - \qquad (5)$$

-continued $$97.5 - \text{round}\left\{\left(n_{RB} - \frac{N_{RB}}{2} + 1\right) \times 180 - 97.5\right\} \text{ (kHz)};$$

or if $n_{RB} \geq \frac{N_{RB}}{2}$, $$\Delta f = \qquad (6)$$

$$\left(n_{RB} - \frac{N_{RB}}{2}\right) \times 180 + 97.5 - \text{round}\left\{\left(n_{RB} - \frac{N_{RB}}{2}\right) \times 180 + 97.5\right\} \text{ (kHz)}.$$

The base station learns the bandwidth of the LTE system and the resource block index, and sends the bandwidth of the LTE system and the resource block index as the first information to the terminal. The channel bandwidth parameter is an important parameter for the terminal. In a process of implementing the technical solutions of the present invention, the channel bandwidth parameter is sent to the terminal, so that the terminal implements another function according to the bandwidth parameter.

The first information in this application may be used to indicate a first downlink carrier frequency offset, a first uplink carrier frequency offset, or a first downlink carrier frequency offset and a first uplink carrier frequency offset.

In an actual application process of this application, values of the first carrier frequency offset between the actual cell carrier center frequency and the cell carrier center frequency that is obtained by the terminal may be fewer than the values listed in the second row and the second column of Table 1, and may be a subset of the listed values. The second or the third example may be further simplified.

For example, for the second example, Table 1 may be simplified into Table 2, that is, values of the first carrier frequency offset herein are a part of the original values, and this part is values of the first carrier frequency offset that are most common in actual application:

TABLE 2

| | |
|---|---|
| Indication parameters of a first carrier frequency offset | 1, 2, 3, 4 |
| Values of a first carrier frequency offset (kHz) | −7.5, −2.5, 2.5, 7.5 |

Figure 5:
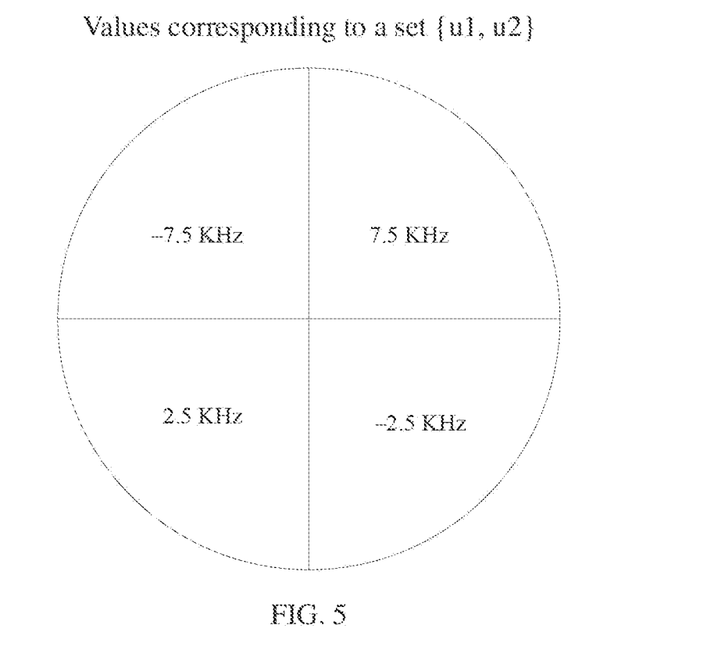
FIG. 5 is a schematic diagram of an information parameter correspondence according to an embodiment of the present invention.

For another example, for the third example, as shown in FIG. 5, the set {u1, u2} has four values, which respectively correspond to four values of the first carrier frequency offset: −7.5 kHz, −2.5 kHz, 2.5 kHz, and 7.5 kHz.

According to an actual system situation, an advantage of the foregoing manner is that resource utilization is maximized and unnecessary system overheads are avoided.

The base station may send the first information to the terminal in the following manner according to content included in the first information determined by the base station:

The base station may send the first information to the terminal by adding the first information to the broadcast message or the dedicated message that is sent by the base station to the cell.

It should be noted that, in actual application, the first information may include at least one of the value of the first carrier frequency offset, the indication parameter of the first carrier frequency offset, the value of the root index of the SSS, and channel bandwidth of a wireless mobile network and a resource block index of the wireless mobile network.

In an example, when the first information includes the value of the root index of the SSS, that the base station sends the first information to the terminal includes: the base station sends the SSS to the terminal. The SSS is generated by using a particular root index, and the base station can send, to the terminal, the SSS, that is, the first information that can indicate the first carrier frequency offset. For example, when the SSS includes the SSS1 and the SSS2, and when the base station sends the secondary synchronization signal to the terminal, the terminal can correspondingly obtain the value of the first carrier frequency offset according to the set of the root index of the SSS1 and the root index of the SSS2. During a synchronization process, the terminal makes compensation for the carrier frequency offset and a sampling frequency offset according to a synchronization estimation result. However, as a result of a carrier frequency offset problem of the NB-IoT system, the compensation for the sampling frequency offset is excessive rather than correct. Therefore, a message sent by the base station may fail to be received. In both manners of the foregoing two examples, after implementing downlink synchronization, the terminal obtains the information about the first carrier frequency offset by receiving the message sent by the base station. In this case, if the first information is sent in advance at the same time as an SSS sending stage at a downlink synchronization stage to ensure that the terminal can obtain the first information as early as possible, the actual cell downlink carrier center frequency is obtained at the downlink synchronization stage, so that a failure in a subsequent communication process is avoided.

In this case, the base station can further indicate the first carrier frequency offset to the terminal by using a location of the SSS (for example, numbers of different subframes in which SSSs are located respectively correspond to different values of the first carrier frequency offset, or different relative locations of a plurality of SSS s correspond to different values of the first carrier frequency offset), a sequence type (for example, different types used by SSS sequences respectively correspond to different values of the first carrier frequency offset), or another parameter as the first information.

The terminal receives the first information sent by the base station.

The terminal that obtains the first information can restore the value of the first carrier frequency offset, to obtain the actual cell carrier center frequency.

According to the first example of step 401, the first information includes the value of the first carrier frequency offset.

The terminal receives the first information by using the broadcast message or the dedicated message. In this case, the value of the first carrier frequency offset is the value that is of the first carrier frequency offset and that needs to be restored.

In this case, the terminal adds the value of the first carrier frequency offset to the obtained cell carrier center frequency, to obtain the actual cell carrier center frequency. For details, refer to the following formula (7):

Cell carrier center frequency $f_{NB-IoT} = f_0 + \Delta f$ where $f_0$ is the cell carrier center frequency obtained by the terminal, and $\Delta f$ is the value of the first carrier frequency offset.

According to the second example of step 401, the first information includes the indication parameter of the first carrier frequency offset.

It may be learned, from step 402, that the terminal receives the first information by using the broadcast message or the dedicated message. In this case, the terminal searches, according to the indication parameter of the first carrier frequency offset, Table 1 or Table 2 for the value that is of the first carrier frequency offset and that is corresponding to the indication parameter of the first carrier frequency offset. Then, the actual cell carrier center frequency may be obtained according to formula (7).

According to the third example of step 401, the first information includes the value of the root index of the SSS. Herein, an example in which the information about the first carrier frequency offset is indicated by using a pair of root indexes u1 and u2 of a pair of secondary synchronization signals SSS1 and SSS2 that are included in the SSS is used for description.

When receiving the first information by using the broadcast message or the dedicated message, the terminal may obtain the value of the first carrier frequency offset according to the correspondence agreed on by the terminal and the base station in advance. Then, the actual cell carrier center frequency may be obtained according to formula (7).

The terminal receives the SSS1 and the SSS2, and a type of the SSS1 and the SSS2 may be a ZC sequence. The terminal performs matching attempts by using different root indexes to restore the received two ZC sequences, and finally obtains, as the root index of the SSS1 and the root index of the SSS2, root indexes that can be used to restore the two ZC sequences. The root index of the SSS1 is u1, and the root index of the SSS2 is u2. The terminal may obtain the value of the first carrier frequency offset according to the correspondence between the {u1, u2} and the value of the first carrier frequency offset. The terminal corrects the synchronization estimation result and a synchronization error compensation operation according to the obtained value of the first carrier frequency offset. That is, the actual cell carrier center frequency is obtained by using formula (7). In this case, the actual cell carrier center frequency is the actual cell downlink carrier center frequency.

According to the fourth example of step 401, the first information includes the bandwidth parameter (for example, the channel bandwidth of the LTE system) and the RB index parameter.

It may be learned, from step 402, that the terminal receives the first information by using the broadcast message or the dedicated message. In this case, the terminal may restore the value of the first carrier frequency offset based on formulas (3) to (6) according to the channel bandwidth of the LTE system and the RB index. Then, the actual cell carrier center frequency may be obtained according to formula (7).

After obtaining the actual cell carrier center frequency, the terminal can perform, on the actual cell carrier center frequency, procedures such as uplink synchronization with the base station and the sampling frequency synchronization, so as to implement high-quality communication with the base station.

According to the technical solution provided in this embodiment, the base station sends, to the terminal, the first information indicating the first carrier frequency offset, so that the terminal obtains the actual cell carrier center frequency. The terminal performs a communication procedure such as synchronization with the base station on the actual cell carrier center frequency, so as to avoid adverse impact, such as an uplink synchronization failure, caused by a cognitive deviation of the terminal from the cell carrier center frequency. Therefore, quality of communication between the terminal and the base station is effectively improved.

Figure 6:
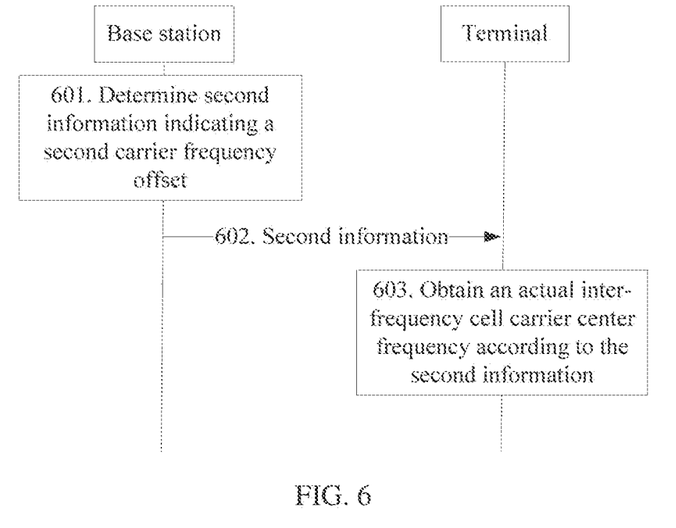
FIG. 6 is a schematic flowchart of another information indication method according to an embodiment of the present invention.

FIG. 6 provides a schematic flowchart of another information indication method. The method may be applied to the system architecture shown in FIG. 2 and the application scenario shown in FIG. 3, and the method includes steps 401 to 403 of the method shown in FIG. 4. Steps 401 to 403 are already described above in detail. For details, refer to content of steps 401 to 403, and the details are not described herein again. The method further includes the following steps:

601. A base station determines second information indicating a second carrier frequency offset, where the second carrier frequency offset is a carrier frequency offset between an actual inter-frequency cell carrier center frequency and an inter-frequency cell carrier center frequency that is obtained by a terminal.

602. The base station sends the second information to the terminal, where the second information is used to obtain the actual inter-frequency cell carrier center frequency.

603. The terminal obtains the actual inter-frequency cell carrier center frequency according to the second information.

The following performs detailed description by using an example in which the cell is a cell in an NB-IoT system and the NB-IoT system works in an operation mode 2 or 3.

The method may be applied to a cell handover procedure. Similarly, when the terminal performs an inter-frequency cell search for a cell handover, there is an offset between the inter-frequency cell carrier center frequency that is obtained by the terminal and an actual value. An execution manner of this step is basically consistent with that of step 401. Herein, the determined second information of an inter-frequency cell of the cell is used to indicate the second carrier frequency offset. The second carrier frequency offset is the carrier frequency offset between the actual inter-frequency cell carrier center frequency and the inter-frequency cell carrier center frequency that is obtained by the terminal. The second information may be sent to the terminal by using a broadcast message or a dedicated message of the cell.

After the terminal is handed over to the inter-frequency cell, a value of the second carrier frequency offset of an inter-frequency cell uplink carrier center frequency or an indication parameter of the second carrier frequency offset may be obtained by using a broadcast message or a dedicated message of the inter-frequency cell.

The terminal receives the second information sent by the base station.

The terminal obtains the value of the second carrier frequency offset according to the second information, and further obtains the inter-frequency cell carrier center frequency.

A specific execution manner of this step is basically consistent with that of step 403, and details are not described herein again.

The terminal determines the actual inter-frequency cell carrier center frequency according to the second information, so that a search can be rapidly and accurately performed on the inter-frequency cell, thereby making an adequate preparation for a subsequent possible cell handover.

Certainly, the actual inter-frequency cell carrier center frequency obtained by the terminal may also be used for another procedure in addition to the cell handover. This is not limited herein.

The foregoing mainly describes the solutions provided in the embodiments of the present invention from a perspective of interaction between the base station and the terminal. It may be understood that, to implement the foregoing functions, the base station and the terminal include a corresponding hardware structure and/or software module for performing each function. A person skilled in the art should be easily aware that, in combination with the example units and algorithm steps described in the embodiments disclosed in this specification, the present invention can be implemented by hardware or a combination of hardware and computer software. Whether a function is performed by hardware or computer software-driven hardware depends on particular applications and designed constraint conditions of the technical solutions. A person skilled in the art may use different methods to implement the described functions for each particular application, but it should not be considered that the implementation goes beyond the scope of the present invention.

Figure 7:
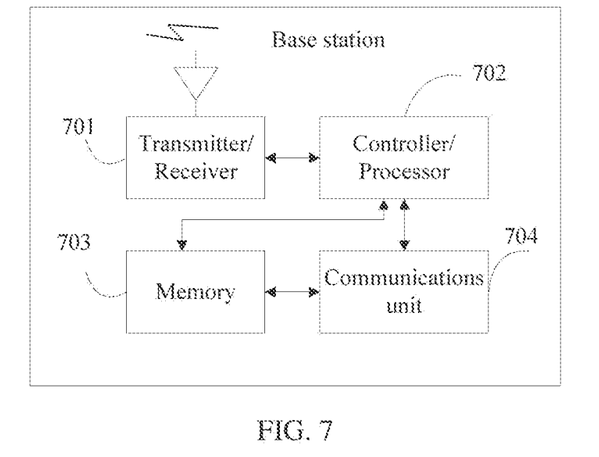
FIG. 7 is a schematic structural diagram of a base station according to an embodiment of the present invention.

FIG. 7 shows a possible schematic structural diagram of a base station in the foregoing embodiments.

The base station includes a transmitter/receiver 701, a controller/processor 702, a memory 703, and a communications unit 704. The transmitter/receiver 701 is configured to support information receiving and transmission between the base station and a terminal, and support radio communication between the terminal and another terminal. The controller/processor 702 performs various functions used for communication with the terminal. On an uplink, an uplink signal from the terminal is received by using an antenna, demodulated by the receiver 701, and further processed by the controller/processor 702, so as to restore service data and signaling information that are sent by the terminal. On a downlink, service data and a signaling message are processed by the controller/processor 702, and modulated by the transmitter 701 to generate a downlink signal, and the downlink signal is sent to the terminal by using the antenna. The controller/processor 702 further performs processing processes related to the base station in FIG. 4 and FIG. 6 and/or another process of technologies described in this application. The memory 703 is configured to store program code and data of the base station. The communications unit 704 is configured to support communication between the base station and another network device.

It may be understood that, FIG. 7 merely shows a simplified design of the base station. In actual application, the base station may include any quantity of transmitters, receivers, processors, controllers, memories, communications units, and the like. All base stations that can implement the present invention fall within the protection scope of the present invention.

Figure 8:
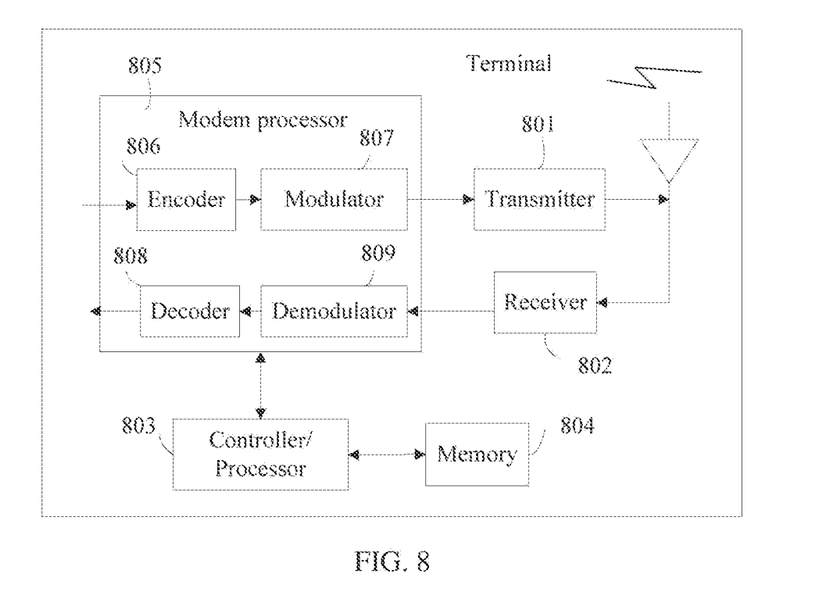
FIG. 8 is a schematic structural diagram of a terminal according to an embodiment of the present invention.

FIG. 8 shows a possible schematic structural diagram of a terminal in the foregoing embodiments. The terminal includes a transmitter 801, a receiver 802, a controller/processor 803, a memory 804, and a modem processor 805.

The transmitter 801 adjusts (such as by means of analog conversion, filtering, amplification, and up-conversion) output sampling and generates an uplink signal, and the uplink signal is transmitted to the base station in the foregoing embodiment by using an antenna. On a downlink, the antenna receives a downlink signal transmitted by an access network device in the foregoing embodiments. The receiver 802 adjusts (such as by means of filtering, amplification, down-conversion, and digitization) the signal received from the antenna, and provides input sampling. In the modem processor 805, an encoder 806 receives service data and a signaling message that are to be sent on an uplink, and processes (such as by means of formatting, encoding, and interleaving) the service data and the signaling message. A modulator 807 further processes (such as by means of symbol mapping and modulation) the service data and the signaling message that are encoded, and provides output sampling. A demodulator 809 processes (such as by means of demodulation) the input sampling and provides symbol estimation. A decoder 808 processes (such as by means of de-interleaving and decoding) the symbol estimation, and provides the data and the signaling message that are decoded and that are sent to the terminal. The encoder 806, the modulator 807, the demodulator 809, and the decoder 808 may be implemented by the composite modem processor 805. These units perform processing according to a radio access technology (for example, an access technology of LTE and another evolved system) used by a radio access network.

The controller/processor 803 controls and manages an action of the terminal to perform the processing performed by the terminal in the foregoing embodiments, and controls the transmitter 801 and the receiver 802 to complete actions performed by the terminal in FIG. 4 and FIG. 6. The memory 804 is configured to store program code and data for the terminal.

Figure 9:
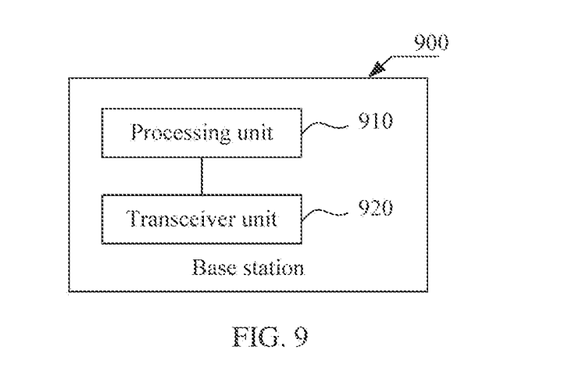
FIG. 9 is another schematic structural diagram of a base station according to an embodiment of the present invention.

FIG. 9 is a base station 900 according to an embodiment of the present invention. The base station 900 may include a processing unit 910 and a transceiver unit 920. The processing unit 910 can implement the functions of the controller/processor 702 of the base station in FIG. 7, and the transceiver unit 920 can implement the functions of the transmitter/receiver 701 of the base station in FIG. 7.

Figure 10:
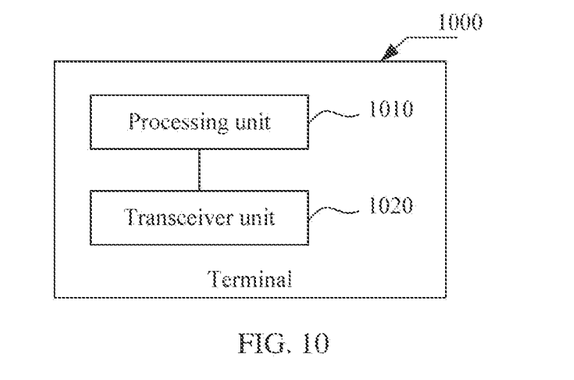
FIG. 10 is another schematic structural diagram of a terminal according to an embodiment of the present invention.

FIG. 10 is a terminal 1000 according to an embodiment of the present invention.

The terminal 1000 may include a processing unit 1010 and a transceiver unit 1020. The processing unit 1010 can implement the functions of the controller/processor 803 of the terminal in FIG. 8, and the transceiver unit 1020 can implement the functions of the transmitter 801 and the receiver 802 of the terminal in FIG. 8.

A person skilled in the art may further understand that various illustrative logical blocks and steps that are listed in the embodiments of the present invention may be implemented by using electronic hardware, computer software, or a combination thereof. To clearly display the interchangeability between the hardware and the software, functions of the foregoing various illustrative components and steps have been generally described. Whether the functions are implemented by using hardware or software depends on particular applications and a design requirement of the entire system. For each particular application, a person skilled in the art may use various methods to implement the described functions, but it should not be understood that the implementation goes beyond the scope of the embodiments of the present invention.

The various illustrative logical blocks, modules, and circuits described in the embodiments of the present invention may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may also be any traditional processing unit, controller, microcontroller, or state machine. The processing unit may also be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the field. For example, a storage medium may connect to a processing unit, so that the processing unit may read information from the storage medium, and write information to the storage medium. Optionally, the storage medium may further be integrated into a processing unit. The processing unit and the storage medium may be configured in an ASIC, and the ASIC may be configured in a user terminal. Optionally, the processing unit and the storage medium may also be arranged in different components of the user terminal.

In one or more example designs, the foregoing functions described in the embodiments of the present invention may be implemented by using hardware, software, firmware, or any combination thereof. If the present invention is implemented by software, these functions may be stored in a computer-readable medium, or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL), or in a wireless manner such as infrared, radio, or microwave, the software is also included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the field. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A communications method comprising: receiving first information that indicates a first offset from a first set of offsets, wherein the first set of the offsets comprises: −7.5 kHz, −2.5 kHz, 2.5 kHz, 7.5 kHz; obtaining a carrier center frequency of a cell according to the first offset indicated by the first information; and receiving second information that indicates a second offset from a second set of offsets, wherein the second offset is an offset of a carrier center frequency of an inter-frequency cell; wherein the second set of the offsets comprises: −47.5 KHz, −42.5 KHz, −37.5 KHz, −32.5 KHz, −27.5 KHz, −22.5 KHz, −17.5 KHz, −12.5 KHz, −7.5 KHz, −2.5 KHz, 47.5 KHz, 42.5 KHz, 37.5 KHz, 32.5 KHz, 27.5 KHz, 22.5 KHz, 17.5 KHz, 12.5 KHz, 7.5 KHz, 2.5 KHz, 0 KHz.

2. The method according to claim 1, wherein the first carrier center frequency is a multiple of 100 KHz and is a carrier center frequency of the cell obtained by a terminal.

3. The method according to claim 1, wherein among all carrier center frequencies that satisfies an integral multiple of 100 KHz, the first carrier center frequency is closest to the carrier center frequency of the cell.

4. The method according to claim 1, wherein the first information comprises a value of the first offset and/or a parameter corresponding to the value of the first offset.

5. The method according to claim 1, wherein the receiving first information comprises: receiving a broadcast message carrying the first information.

6. The method according to claim 1, wherein the first offset comprises a downlink offset.

7. A communications method comprising: determining first information that indicates a first offset from a first set of offsets, wherein the first set of the offsets comprises: −7.5 kHz, −2.5 kHz, 2.5 kHz, 7.5 kHz; sending the first information; and sending second information that indicates a second offset from a second set of offsets, wherein the second offset is an offset of a carrier center frequency of an inter-frequency cell; wherein the second set of the offsets comprises: −47.5 KHz, −42.5 KHz, −37.5 KHz, −32.5 KHz, −27.5 KHz, −22.5 KHz, −17.5 KHz, −12.5 KHz, −7.5 KHz, −2.5 KHz, 47.5 KHz, 42.5 KHz, 37.5 KHz, 32.5 KHz, 27.5 KHz, 22.5 KHz, 17.5 KHz, 12.5 KHz, 7.5 KHz, 2.5 KHz, 0 KHz.

8. The method, according to claim 7, wherein the first carrier center frequency is a multiple of 100 KHz and is a carrier center frequency of the cell obtained by a terminal.

9. The method according to claim 7, wherein among all carrier center frequencies that satisfies an integral multiple of 100 KHz, the first carrier center frequency is closest to the carrier center frequency of the cell.

10. The method according to claim 7, wherein the first information comprises a value of the first offset and/or a parameter corresponding to the value of the first offset.

11. The method according to claim 7, wherein the sending first information comprises: sending a broadcast message carrying the first information.

12. The method according to claim 7, wherein the first offset comprises a downlink offset.

13. A communications apparatus comprising: a processor; and a non-transitory computer-readable storage medium coupled to the processor and storing programming instructions for execution by the processor, the programming instructions instruct the processor such that the communications apparatus is at least configured to: receive first information that indicates a first offset from a first set of offsets, wherein the first set of the offsets comprises: −7.5 kHz, −2.5 kHz, 2.5 kHz, 7.5 kHz; obtain a carrier center frequency of a cell according to the first offset indicated by the first information; and receive second information that indicates a second offset from a second set of offsets, wherein the second offset is an offset of a carrier center frequency of an inter-frequency cell: wherein the second set of the offsets comprises: −47.5 KHz, −42.5 KHz, −37.5 KHz, −32.5 KHz, −27.5 KHz, −22.5 KHz, −17.5 KHz, −12.5

KHz, −7.5 KHz, −2.5 KHz, 47.5 KHz, 42.5 KHz, 37.5 KHz, 32.5 KHz, 27.5 KHz, 22.5 KHz, 17.5 KHz, 12.5 KHz, 7.5 KHz, 2.5 KHz, 0 KHz.

14. The communications apparatus according to claim 13, wherein the first carrier center frequency that is a multiple of 100 KHz is a carrier center frequency of the cell obtained by the apparatus.

15. The communications apparatus according to claim 13, wherein among all carrier center frequencies that satisfies an integral multiple of 100 KHz, the first carrier center frequency is closest to the carrier center frequency of the cell.

16. The communications apparatus according to claim 13, wherein the first information comprises a value of the first offset and/or a parameter corresponding to the value of the first offset.

17. The communications apparatus according to claim 13, wherein the first offset comprises a downlink offset.

18. The communications apparatus according to claim 13, wherein the cell is a narrow band-internet of things (NB-IoT) cell.

19. A communications apparatus, comprising: a processor; and a non-transitory computer-readable storage medium coupled to the processor and storing programming instructions for execution by the processor, the programming instructions instruct the processor such that the communications apparatus is at least configured to: determine first information that indicates a first offset from a first set of offsets, wherein the first set of the offsets comprises: −7.5 kHz, −2.5 kHz, 2.5 kHz, 7.5 kHz; send the first information, and send second information that indicates a second offset from a second set of offsets, wherein the second offset is an offset of a carrier center frequency of an inter-frequency cell; wherein the second set of the offsets comprises: −47.5 KHz, −42.5 KHz, −37.5 KHz, −32.5 KHz, −27.5 KHz, −22.5 KHz, −17.5 KHz, −12.5 KHz, −7.5 KHz, −2.5 KHz, 47.5 KHz, 42.5 KHz, 37.5 KHz, 32.5 KHz, 27.5 KHz, 22.5 KHz, 17.5 KHz, 12.5 KHz, 7.5 KHz, 2.5 KHz, 0 KHz.

20. The communications apparatus according to claim 19, wherein among all carrier center frequencies that satisfies integral multiple of 100 KHz, the first carrier center frequency is closest to the carrier center frequency of the cell.

21. The method according to claim 1, wherein the first offset comprises an uplink offset.

22. The method according to claim 7, wherein the first offset comprises an uplink offset.

23. The communications apparatus according to claim 13, wherein the first offset comprises an uplink offset.

24. The method according to claim 1, wherein the first offset is an offset from a first carrier center frequency that is a multiple of 100 KHz.

25. The method according to claim 7, wherein the first offset is an offset from a first carrier center frequency that is a multiple of 100 KHz.

26. The communications apparatus according to claim 13, wherein the first offset is an offset from a first carrier center frequency that is a multiple of 100 KHz.

27. The communications apparatus according to claim 19, wherein the first offset is an offset from a first carrier center frequency that is multiple of 100 KHz.

\* \* \* \* \*

UNITED STATES PATENT AND TRADEMARK OFFICE
CERTIFICATE OF CORRECTION

PATENT NO. : 12,058,634 B2
APPLICATION NO. : 18/302086
DATED : August 6, 2024
INVENTOR(S) : Zhe Chen It is certified that error appears in the above-identified patent and that said Letters Patent is hereby corrected as shown below:

On the Title Page

Change:
(71) Applicant: HUAWEI TECHNOLOGIES CO., LTD., Guangdong (CN)
To:
(71) Applicant: HUAWEI TECHNOLOGIES CO., LTD., Shenzhen (CN)

In the Claims

At Column 17, Line 62, replace the claims with the following correct claim set:
1. A communications method comprising:
   receiving first information that indicates a first offset from a first set of offsets, wherein the first set of the offsets comprises: -7.5 kHz, -2.5kHz, 2.5kHz, 7.5kHz;
   obtaining a carrier center frequency of a cell according to the first offset indicated by the first information; and
   receiving second information that indicates a second offset from a second set of offsets, wherein the second offset is an offset of a carrier center frequency of an inter-frequency cell;
   wherein the second set of the offsets comprises: -47.5KHz, -42.5KHz, -37.5KHz, -32.5KHz, -27.5KHz, -22.5KHz, -17.5KHz, -12.5KHz, -7.5KHz, -2.5KHz, 47.5KHz, 42.5KHz, 37.5KHz, 32.5KHz, 27.5KHz, 22.5KHz, 17.5KHz, 12.5KHz, 7.5KHz, 2.5KHz, 0KHz.

2. The method according to claim 1, wherein the first offset is an offset from a first carrier center frequency that is a multiple of 100 KHz.

3. The method according to claim 2, wherein the first carrier center frequency is a multiple of 100 KHZ and is a carrier center frequency of the cell obtained by a terminal.

Signed and Sealed this
Eighth Day of October, 2024

Katherine Kelly Vidal
*Director of the United States Patent and Trademark Office*

CERTIFICATE OF CORRECTION (continued)
U.S. Pat. No. 12,058,634 B2

4. The method according to claim 2, wherein among all carrier center frequencies that satisfies an integral multiple of 100KHz, the first carrier center frequency is closest to the carrier center frequency of the cell.

5. The method according to claim 1, wherein the first information comprises a value of the first offset and/or a parameter corresponding to the value of the first offset.

6. The method according to claim 1, wherein the receiving first information comprises: receiving a broadcast message carrying the first information.

7. The method according to claim 1, wherein the first offset comprises a downlink offset.

8. A communications method comprising:
    determining first information that indicates a first offset from a first set of offsets, wherein the first set of the offsets comprises: -7.5 kHz, -2.5kHz, 2.5kHz, 7.5kHz,;
    sending the first information; and
    sending second information that indicates a second offset from a second set of offsets, wherein the second offset is an offset of a carrier center frequency of an inter-frequency cell;
    wherein the second set of the offsets comprises: -47.5KHz, -42.5KHz, -37.5KHz, -32.5KHz, -27.5KHz, -22.5KHz, -17.5KHz, -12.5KHz, -7.5KHz, -2.5KHz, 47.5KHz, 42.5KHz, 37.5KHz, 32.5KHz, 27.5KHz, 22.5KHz, 17.5KHz, 12.5KHz, 7.5KHz, 2.5KHz, 0KHz.

9. The method according to claim 8, wherein the first offset is an offset from a first carrier center frequency that is a multiple of 100 KHZ.

10. The method according to claim 9, wherein the first carrier center frequency is a multiple of 100 KHz and is a carrier center frequency of the cell obtained by a terminal.

11. The method according to claim 9, wherein among all carrier center frequencies that satisfies an integral multiple of 100KHz, the first carrier center frequency is closest to the carrier center frequency of the cell.

12. The method according to claim 8, wherein the first information comprises a value of the first offset and/or a parameter corresponding to the value of the first offset.

13. The method according to claim 8, wherein the sending first information comprises: sending a broadcast message carrying the first information.

14. The method according to claim 8, wherein the first offset comprises a downlink offset.

15. A communications apparatus comprising:
    a processor; and
    a non-transitory computer-readable storage medium coupled to the processor and storing programming instructions for execution by the processor, the programming instructions instruct the processor such that the communications apparatus is at least configured to:
  receive first information that indicates a first offset from a first set of offsets, wherein the first set of the offsets comprises: -7.5 kHz, -2.5kHz, 2.5kHz, 7.5kHz;
  obtain a carrier center frequency of a cell according to the first offset indicated by the first information; and
  receive second information that indicates a second offset from a second set of offsets, wherein the second offset is an offset of a carrier center frequency of an inter-frequency cell;
  wherein the second set of the offsets comprises: -47.5KHz, -42.5KHz, -37.5KHz, -32.5KHz, -27.5KHz, -22.5KHz, -17.5KHz, -12.5KHz, -7.5KHz, -2.5KHz, 47.5KHz, 42.5KHz, 37.5KHL, 32.5KHz, 27.5KHz, 22.5KHz, 17.5KHz, 12.5KHz, 7.5KHz, 2.5KHz, 0KHz.

16. The communications apparatus according to claim 15, wherein the first offset is an offset from a first carrier center frequency that is a multiple of 100 KHz.

17. The communications apparatus according to claim 16, wherein the first carrier center frequency that is a multiple of 100 KHz is a carrier center frequency of the cell obtained by the apparatus.

18. The communications apparatus according to claim 16, wherein among all carrier center frequencies that satisfies an integral multiple of 100KHz, the first carrier center frequency is closest to the carrier center frequency of the cell.

19. The communications apparatus according to claim 15, wherein the first information comprises a value of the first offset and/or a parameter corresponding to the value of the first offset.

20. The communications apparatus according to claim 15, wherein the first offset comprises a downlink offset.

21. The communications apparatus according to claim 15, wherein the cell is a narrow band-internet of things (NB-IoT) cell.

22. A communications apparatus, comprising:
  a processor; and
  a non-transitory computer-readable storage medium coupled to the processor and storing programming instructions for execution by the processor, the programming instructions instruct the processor such that the communications apparatus is at least configured to:
    determine first information that indicates a first offset from a first set of offsets, wherein the first set of the offsets comprises: -7.5 kHz, -2.5kHz, 2.5kHz, 7.5kHz;
    send the first information; and
    send second information that indicates a second offset from a second set of offsets, wherein the second offset is an offset of a carrier center frequency of an inter-frequency cell;
    wherein the second set of the offsets comprises: -47.5KHz, -42.5KHz, -37.5KHz, -32.5KHz, -27.5KHz, -22.5KHz, -17.5KHz, -12.5KHz, -7.5KHz, -2.5KHz, 47.5KHz, 42.5KHz, 37.5KHz, 32.5KHz, 27.5KHz, 22.5KHz, 17.5KHz, 12.5KHz, 7.5KHz, 2.5KHz, 0KHz.

23. The communications apparatus according to claim 22, wherein the first offset is an offset from a first carrier center frequency that is multiple of 100 KHz.

24. The communications apparatus according to claim 23, wherein among all carrier center frequencies that satisfies integral multiple of 100KHz, the first carrier center frequency is closest to the carrier center frequency of the cell.

25. The method according to claim 1, wherein the first offset comprises an uplink offset.

26. The method according to claim 8, wherein the first offset comprises an uplink offset.

27. The communications apparatus according to claim 15, wherein the first offset comprises an uplink offset.